C. O. LORENZ.
VISCOSCOMETER.
APPLICATION FILED AUG. 23, 1913.

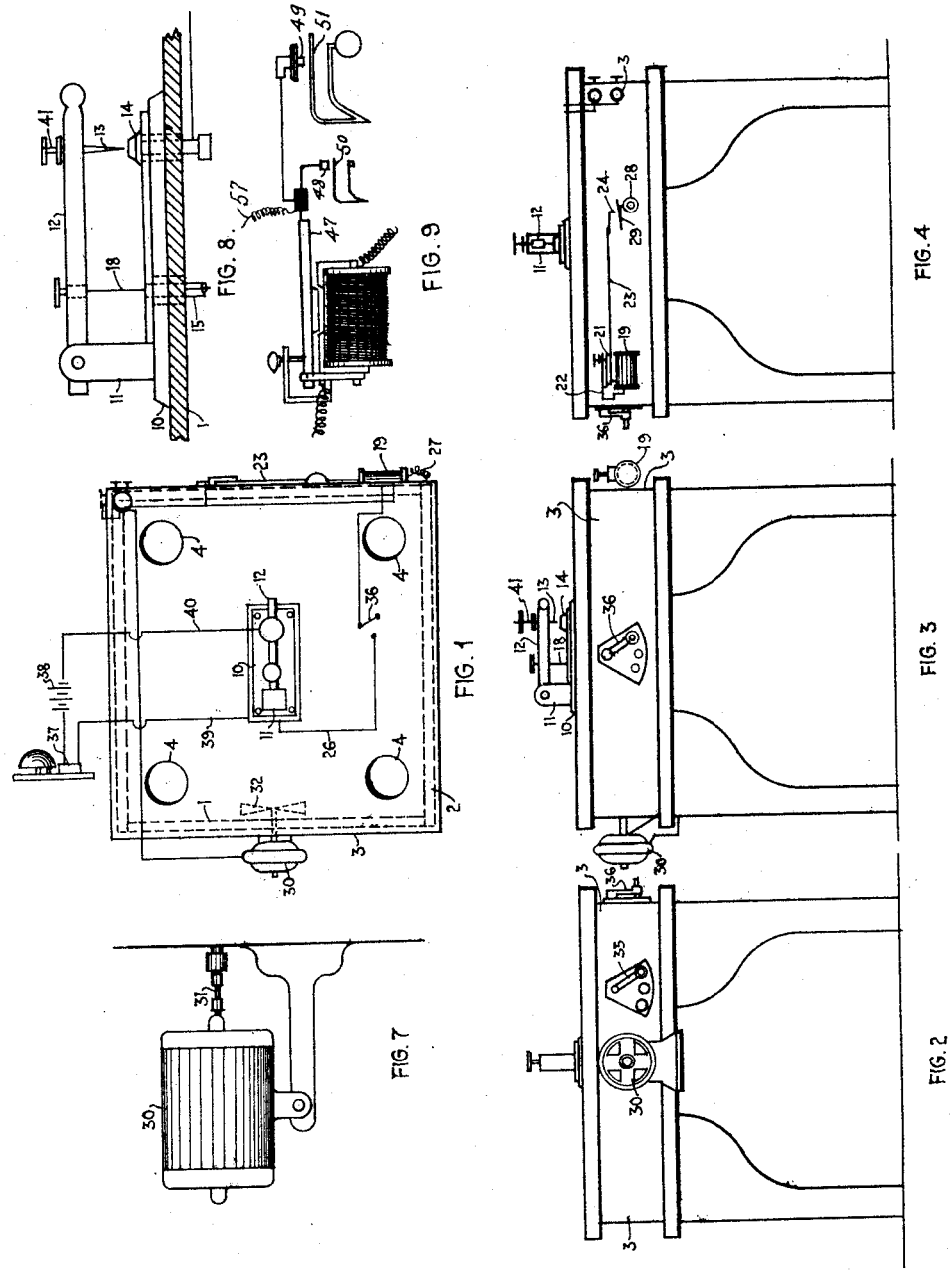

1,187,000.

Patented June 13, 1916.
5 SHEETS—SHEET 2.

WITNESSES:

INVENTOR
Charles O. Lorenz
BY
his ATTORNEYS

C. O. LORENZ.
VISCOSCOMETER.
APPLICATION FILED AUG. 23, 1913.

1,187,000.

Patented June 13, 1916.
5 SHEETS—SHEET 3.

WITNESSES:

INVENTOR
Charles O. Lorenz
BY
his ATTORNEYS

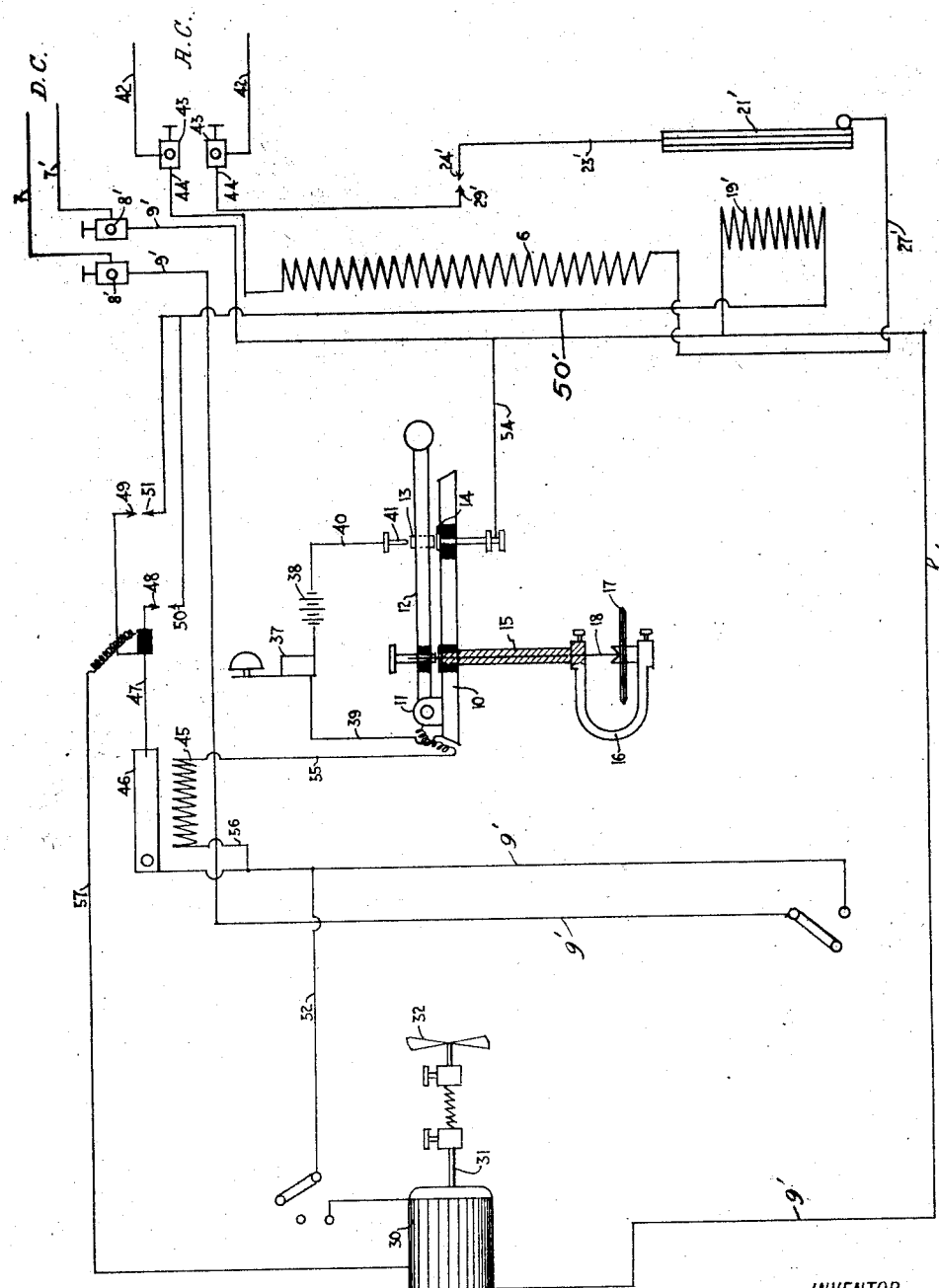

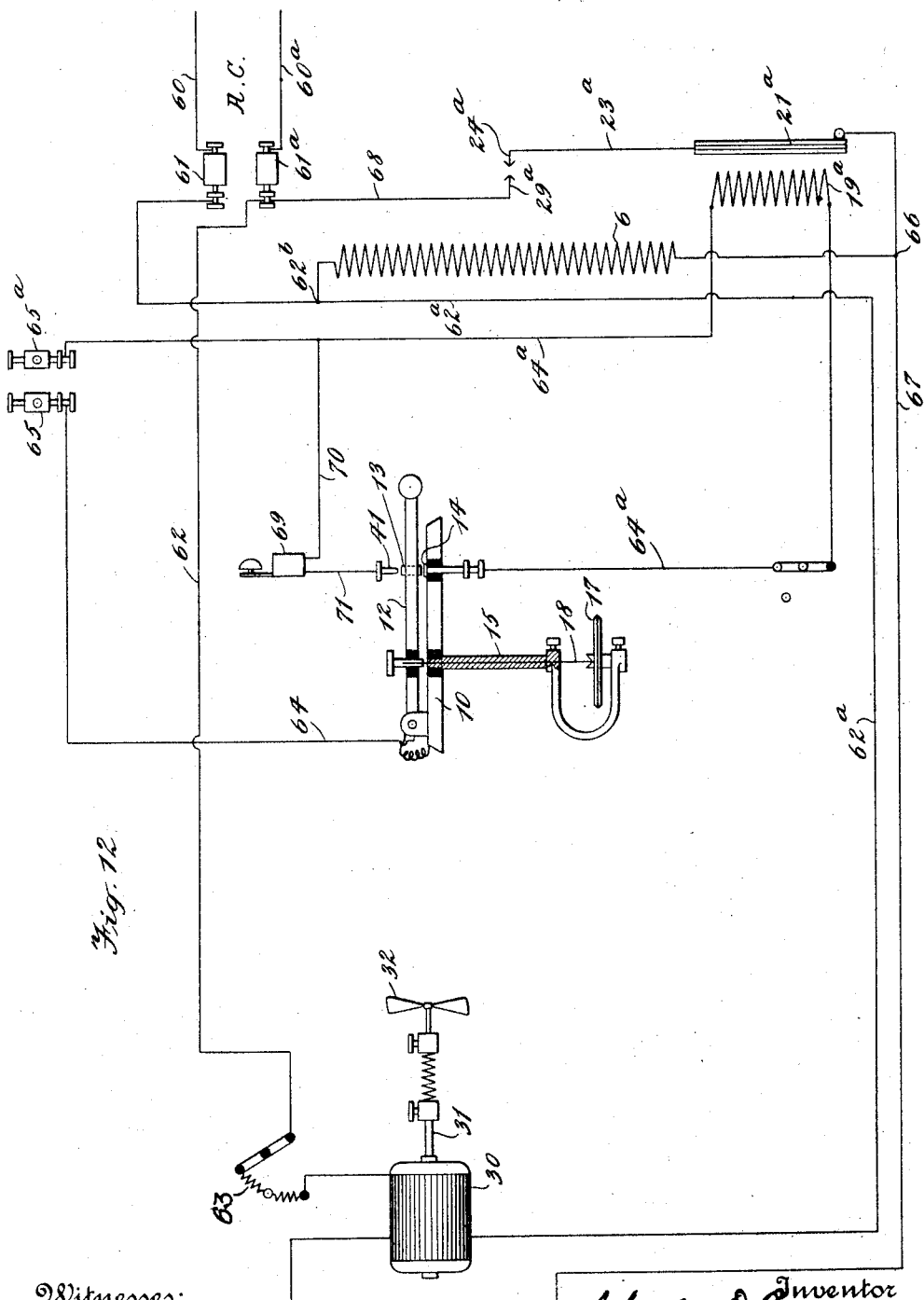

UNITED STATES PATENT OFFICE.

CHARLES O. LORENZ, OF PORT ARTHUR, TEXAS.

VISCOSCOMETER.

1,187,000.   Specification of Letters Patent.   Patented June 13, 1916.

Application filed August 23, 1913. Serial No. 786,224.

*To all whom it may concern:*

Be it known that I, CHARLES O. LORENZ, a citizen of the United States, residing at Port Arthur, in the county of Jefferson and State of Texas, have invented certain new and useful Improvements in Viscoscometers, of which the following is a specification.

This invention relates to new and useful improvements in viscoscometers.

The object of the invention is to provide a device of the character described by means of which the relative viscosity of different liquids, particularly oils, may be accurately determined.

In the process of refining oils, it is necessary to maintain a particular standard of viscosity in accordance with the purpose for which the oil is to be used and it is the object of this invention to provide a device of the character described, whereby this standard may be determined and maintained.

A further feature of the invention resides in the provision of means whereby the oil being tested may be kept at a uniform temperature which condition is essential to the accurate testing of the viscosity of the fluid.

A further feature is the provision of means whereby the oil being tested may be automatically kept at a uniform temperature.

A still further feature of the invention resides in the provision of a device of this character, and for the purpose stated, which may be cheaply and easily constructed, which will effectively accomplish the object for which it is intended and which will not be liable to get out of order and which also comprehends means for indicating any decided rise in the temperature of the fluid.

With the above and other objects in view, the invention has particular relation to certain novel features of construction, operation and arrangement of parts, an example of which is given in this specification and illustrated in the accompanying drawings, wherein—

Figure 6:
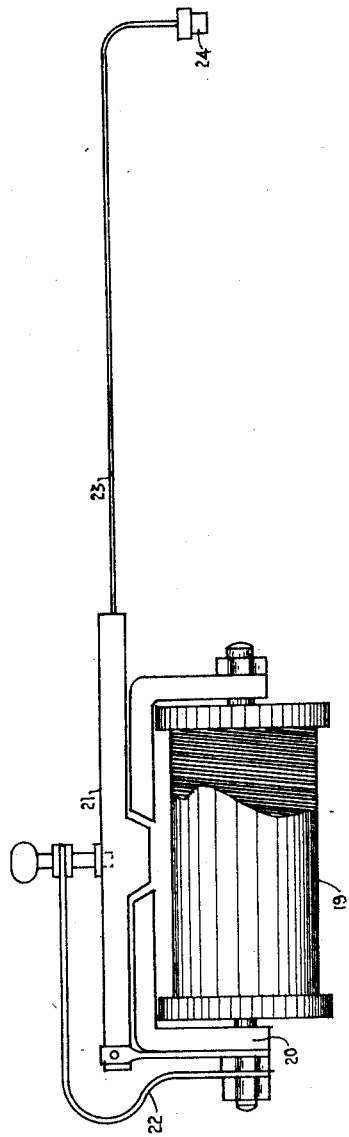
Figure 5:
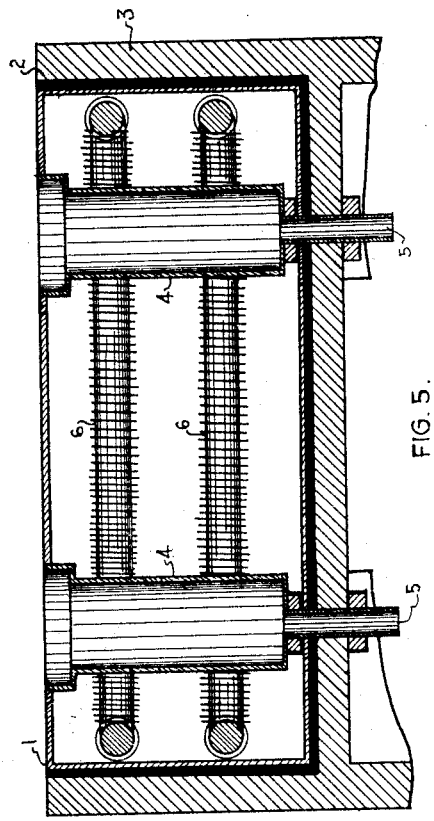
Figure 10:
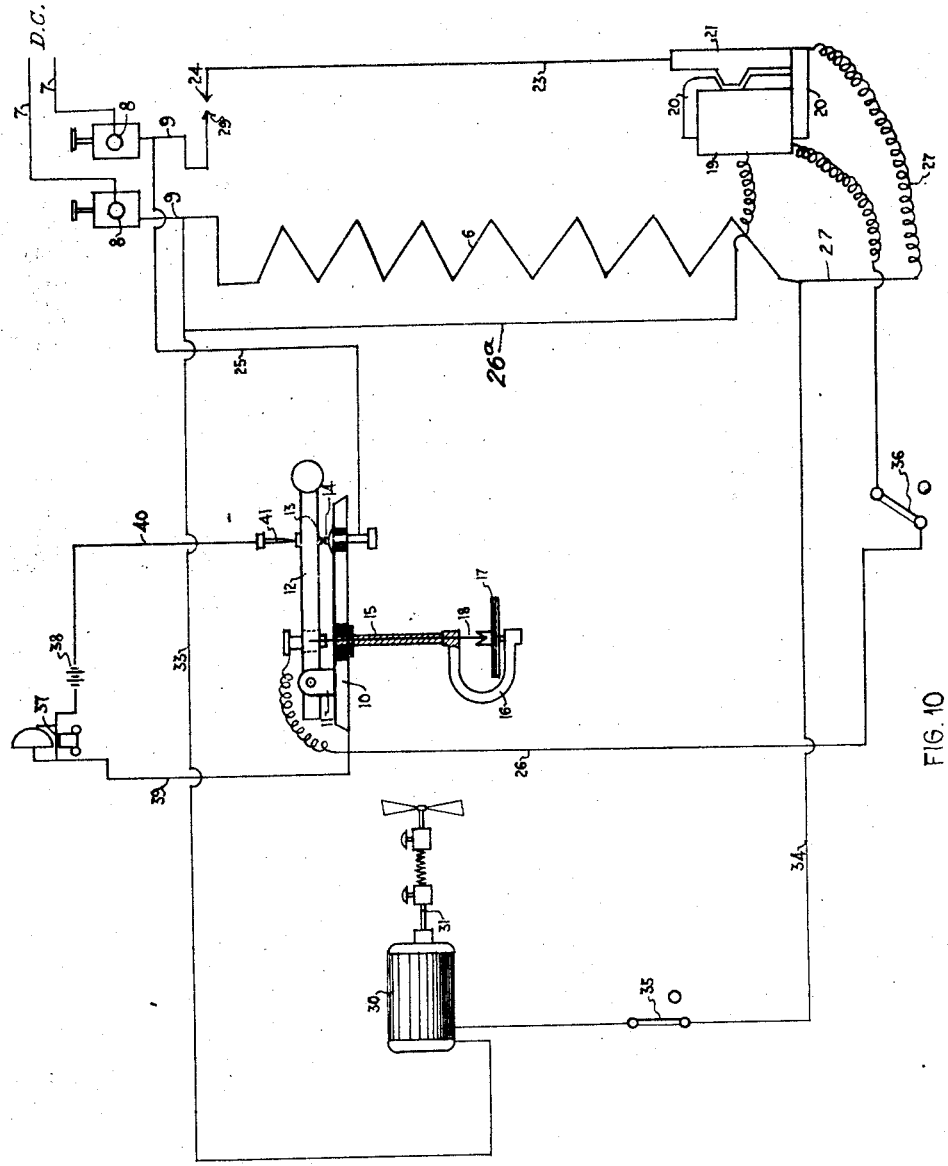

Figure 1 is a plan view of the device. Figs. 2, 3 and 4 show side elevations thereof, as viewed from different sides. Fig. 5 is a sectional side elevation thereof. Fig. 6 is a side elevation of a relay and contact maker used in connection with the device. Fig. 7 is a side elevation of a motor used in connection therewith. Figs. 8 and 9 show, respectively, side elevations of two forms of contact makers used in connection therewith. Fig. 10 shows a plan view of the electrical wiring for one form of the device employing a direct current. Fig. 11 is a plan view of the electrical wiring for another form of the device wherein an alternating current is employed. Fig. 12 is a diagram of another form of wiring.

Referring now more particularly to the drawings wherein like numerals of reference designate similar parts in each of the figures, in Figs. 1 to 5 inclusive, is shown a chamber which may be in the form of a tank 1, preferably made of copper or some other suitable material and surrounded on the sides and bottom by an asbestos packing 2, held in place by a wooden box or covering 3. The tank is entirely inclosed, forming a chamber for a heating fluid, which should preferably be a light oil.

A plurality of receptacles preferably in the form of cups or tubes 4 are fixed in the tank and extend preferably from top to bottom through the chamber inclosed therein. These tubes are open at the top for the reception of the liquid to be tested and have reduced necks 5 at their bottoms having outlet passageways through which the fluid passes, apertures being provided in the bottom of the wooden box surrounding the tank through which the necks 5 protrude.

The joints between the cups or tubes 4 and the bottom and top of the tank 1 are made proof against fluid passage so as to prevent the escape of the fluid from within the chamber of the tank 1. The tubes 4 will thus be surrounded by the fluid, preferably oil, with which the tank 1 is filled and the temperature of the oil within the chamber will regulate the temperature of the oil within the tubes.

Oil of the desired viscosity is placed in one of said cups or tubes and the oil to be tested is placed in another or others of said tubes and it is essential that the oil in the tank 1 surrounding the tubes should be kept at a uniform temperature, as the relative amount of the oils discharged through the reduced necks 5 from the tubes determines the relative viscosity of the oils placed in the tubes.

It is apparent that if a greater or less amount of the oil being tested is discharged than there is of the oil having the desired viscosity, then the oil being tested is not of the desired viscosity. As it is necessary, however, in making an accurate test to maintain a uniform temperature of the oils, a mechanism has been provided for the purpose, which will now be described: Arranged within the tank 1 are heating coils 6, 6, preferably extending around the walls thereof, said coils being formed of conducting wires wound on suitable supporting rods made preferably of fiber or some other non-conducting material, the coils of each series being connected.

The numerals 7, 7 (see Fig. 10) refer to current-conducting wires which lead from batteries or other source of electrical supply (not shown), and are connected to the binding posts 8, 8, from which lead the current-conducting wires 9, 9, which in turn may be connected with the heating coils 6, 6, so as to conduct an electric current therethrough to heat the same, as will hereinafter be set forth. Fixed upon the tank 1 is a contact maker, as shown in detail in Figs. 8, 10 and 11, consisting preferably of a plate 10 secured to said tank, the upright post 11 fixed to said plate, the lever 12 pivoted at one end to the top of said post and the contact points 13 and 14, the former of which extends through the free end of the lever 12 and the latter of which extends through the plate 10 and the top of the tank and is insulated therefrom. Fixed to the plate 10 and insulated therefrom and depending into the chamber of the tank 1 is a pipe 15, and fixed to the lower end of said pipe is a U-shaped yoke 16. This yoke carries a thermostat 17 of any suitable form, and connected to this thermostat is a rod 18 which extends up through the pipe 15 and through the plate 10, and is connected to, but insulated from, the lever 12. This thermostat preferably is at all times immersed in the fluid contained in the tank 1 so as to be responsive to changes of temperature of said fluid.

The construction and operation of the form of thermostat shown is well understood and may be varied, and it is sufficient to say that, if the temperature in the tank 1 rises, the thermostat will be expanded, causing an upward movement of the rod 18 and a corresponding upward movement of the lever 12. If the temperature of the fluid in the tank 1 lowers, the thermostat 17 will gradually contract, exerting a downward pull on the rod 18 and a consequent downward movement of the lever 12. The contacts 13 and 14 will thus be brought together when the temperature of the fluid in the tank lowers and forced apart as it rises.

A relay is carried by the casing of the device consisting of a solenoid 19 mounted in a frame 20, with which solenoid coöperates an armature 21 hinged at one end to the frame 20 and normally held out of contact with the solenoid by a flat spring 22, as shown in Fig. 6. Projecting from the free end of the armature 21 is a rod 23, preferably formed of brass, whose free end is curved downwardly and carries the contact point 24, preferably of platinum.

When the temperature of the fluid in the tank 1 falls below a given point, the thermostat operates as hereinbefore described to bring the contact points 13 and 14 together and to complete a circuit from one of the wires 9, through the wire 25, connecting with the contact point 14, the lever 12, the wire 26 through the solenoid 19 and through said solenoid through the wire 26ª to the other of said wires 9, thereby forming a complete circuit.

One of the current-conducting wires 9 is connected with the heating coils and from said heating coils is a lead wire 27 which connects with the armature 21. The other of said conducting wires 9 connects with a binding post 28 having the contact point 29 alined with the contact point 24 carried by the rod 23. When the solenoid is energized, the armature 21 is attracted toward it, and when pulled toward the solenoid, a contact is made between the contact points 24 and 29 and a circuit is completed from one of the wires 9, through the heating coils 6, the lead wire 27, the armature 21, the rod 23 to the other of said wires 9 and the coils 6 are thus energized and the heat given off therefrom causes the temperature of the oil in the tank 1 to rise. When the temperature has risen to the desired point, the thermostat 17 operates through the push of the rod 18 to break the contact between the points 13 and 14. The solenoid 19 is thus deënergized and the spring 22 (see Fig. 4) operates to lift the armature 21 and break the contact between the contacts 24 and 29. The current is thus cut off from the heating coils until the temperature of the fluid in the tank 1 falls and the contacts are made as herebefore described. It is thus clear that the temperature of said fluid is maintained at substantially a uniform degree and the mechanism may be so constructed as to be very sensitive as to changes in temperature. In fact, a change of one-hundredth part of a degree in temperature will ordinarily be sufficient to make or break the contact between the points 13 and 14, which will result, in the manner herebefore set forth, in energizing the heating coils, or cutting off the contact therefrom and lowering the temperature of said fluid in the tank 1.

In order to keep the temperature of the entire body of fluid in the tank 1 uniform throughout, it is necessary to keep said fluid in motion so that it will all come in contact with the heating coils. For this purpose I have provided a motor 30 which is fixed to one side of the device and which has a flexible shaft 31 extending through the wall of the tank 1 and the inner end of this shaft carries a propelling or impeller wheel 32 having inclined vanes. This wheel 32 is immersed in the liquid in the tank and as it rotates creates a current therein which keeps the fluid constantly circulating around the heating coils.

One of the connecting wires 9 is connected with the motor through the conducting wire 33, and leading from the motor is a conducting wire 34 which connects with the lead wire 27, and when a circuit is completed through the heating coils, simultaneously and by this same means a current is completed through the motor, setting it in motion. The two circuits are broken at the same time, so that the motor is in operation only when the heating coils are energized. Switches 35 and 36 are provided for the purpose of manually breaking the circuit through the motor and the heating coils, respectively.

When the device is in use, it is provided with an electric signal bell 37 of the usual and well known construction. The battery 38 is provided for operating the bell and two current-conducting wires 39 and 40 are connected with the battery, the former of which is connected with the bell mechanism and also with the plate 10 and the latter of which carries a contact point 41 alined above the contact point 13. When the fluid in the tank 1 rises above its normal temperature, the thermostat 17 operates through the rod 18 to lift the lever 12, causing contact between the points 13 and 41 and a circuit is completed from the battery 38 through the bell mechanism, causing the bell to ring. Warning is thus given that the heating fluid is becoming too hot.

The arrangement just described is desirable when a temperature of about one hundred degrees F. is to be employed in testing the viscosity of the liquids, and where alternating current is not available.

In Fig. 11 I have shown a modified form of the device wherein the wiring for an alternating current is employed for heating the heating coils 6, and wherein the direct-current-conducting wires are indicated by the numerals 7', 7', which lead from suitable batteries (not shown), and are connected to the binding posts 8', 8', from which lead the current-conducting wires 9', 9'. The alternating current wires are indicated by the numerals 42, 42, connected to the binding posts 43, 43, from which lead the current-conducting wires 44, 44. One of the wires 44 is connected with the heating coils 6 and from the heating coils leads the conducting wire 27', which is connected to the armature 21', operating in connection with the solenoid 19', in the same manner as the armature 21, heretofore described. The armature 21' has a rod 23' extending from its free end, said rod having the contact point 24' arranged to make a contact with the contact point 29' with which the other of said conducting wires 44 is connected, and thus a circuit is completed through the heating coils when the solenoid 19' is energized. The solenoid 19' is energized when the heating fluid falls below its normal temperature and contact is made between the points 13 and 14, through the conducting wires 9', 9', as hereinbefore described.

In the form of device shown in Fig. 11 an additional relay is provided consisting of the solenoid 45 and the armature 46, the free end of said armature having a rod 47 extending therefrom carrying the contact points 48 and 49, the latter of which is insulated from the rod 47, said contact points being arranged to contact respectively with the contact points 50 and 51, connected with one of the wires 9'. In this form of the device, shown in Fig. 11, a complete circuit is at all times formed through the motor 30 by means of the conducting wires 9', 9' and the conducting wire 52, one of said wires 9' leading directly to said motor and the other being connected with the motor through said wire 52. This circuit causes the motor to run at low speed at all times. When a contact is made between the points 13 and 14 when the temperature of the oil in the tank falls, the solenoid 45 is energized by reason of a circuit being completed from one of said wires 9' through said solenoid to the other of said wires 9'. This circuit is completed from one of the wires 9', through the wire 54, the lever 12 and the wires 55 and 56 to the other wire 9', and when said solenoid 45 is energized the armature 46 is attracted toward the same, causing the points 48 and 50 and the points 49 and 51, respectively, to contact, and an additional circuit is completed through one of the wires 9' through the wire 57, connected with the contact point 49 and through the motor 30 to the other of said wires 9', and an additional current is thus sent through the motor 30 causing it to run at high speed when the points 13 and 14 are in contact and the heating coils energized. At the same time the relay 45 is energized and contact is made at the contacts 48, 50, current passes to the solenoid 19', by one of the wires 9', by way of the armature 46, bar 47, contacts 48, 50, wire 50', through the solenoid 19', and the other wire 9'. This serves to attract the armature 21', closing the heater circuit at contacts 24', 29', and causing alternating current to heat the heaters to raise the temperature of the oil in the tank.

I prefer to employ the arrangement shown in Fig. 11 wherever alternating current is available, and whenever the temperature is to be kept high, say 210° F., under which latter condition alternating current is desirable over direct current, as there is little or no arcing of alternating currents at the contacts, while the necessary amount of direct current to maintain the desired temperature results in arcing at the contacts.

In Fig. 12 I have shown another arrangement of circuits where only alternating current is available, and in which the thermostat controlled circuit for operating the switch to throw the alternating current onto the heaters may be furnished from storage or dry batteries. In this arrangement the connections from the alternating source are shown at 60, 60ª, leading to posts 61, 61ª, a wire 62 connecting the post 61ª with a resistance switch 63, and the motor 30, while the post 61 is connected to the other side of the motor by a wire 62ª, so that the motor may be run at low speed whenever the switch 63 is on. The thermostat controlled switch 12 is in a circuit including wires 64, 64ª, connected respectively to binding posts 65, 65ª connected to suitable storage or dry batteries (not shown), said circuit also including the magnet 19ª for operating the armature 21ª and bar 23ª, connected onto the wire 62ª at 62ᵇ is one end of the coil of the heater 6, the opposite end of which is connected at 66, to a wire 67, connected to one side of the motor 30 and to the armature 23ª. The bar 23ª makes and breaks contact at the contacts 29ª, 24ª, the former being connected to a wire 68 leading to the binding post 61ª.

Under normal conditions the motor is run at low speed by alternating current on the circuit 62, 62ª, and the circuit for the heater is open at the contacts 29ª, 24ª. When the circuit for the magnet 19ª is closed at the contacts 13, 14, upon a drop in temperature, the armature 23ª is operated by the magnet 19ª to close the heater circuit at the contacts 29ª, 24ª, so that alternating current heats the heaters over the circuit, including part of the wire 62ª, part of the wire 66, the armature 21ª, bar 23ª, contacts 29ª, 24ª, and wire 68. At the same time additional current is placed on the motor 30 by way of the wires 62, 67, and armature 21ª, bar 23ª, contacts 29ª, 24ª, and wire 68. The system may include an alarm circuit including a bell 69, connected to the wire 64ª by a wire 70 and to the contact 41 by the wire 7', the bar 12, serving to close a circuit through the bell, over the wire 64, said bar 12, contact 41, wires 71, 70, and 64ª whenever the heating fluid is excessively heated.

While I have shown several different systems for controlling the motor and heating means, I desire it understood that I do not desire to be limited thereto as other systems may be employed without departing from the spirit and scope of my invention.

While I have shown only two forms of this device, it is apparent that mechanical variations may be made therein without departing from the principle of the invention, and it is further obvious that a device of substantially the same construction may be used for different purposes than that set out in the foregoing specification whenever it may be desired to maintain a constant temperature and I hereby reserve the right to make mechanical changes in the construction thereof and adapt the device to various uses for which it may be employed, so long as I do not depart from the principle thereof, as set forth in the appended claims.

What I claim and desire to secure by Letters Patent of the United States is:—

1. In a viscoscometer, in combination, a horizontally disposed chamber adapted to contain a fluid, a plurality of separate receptacles in the chamber and discharging from the bottom of the chamber, heating means in the chamber arranged to be in direct contact with the fluid therein, electrically operated means for circulating the fluid in contact with said coils and the receptacles, and thermostatically controlled means for energizing said heating means and electrically operated means.

2. In a viscoscometer, in combination, a chamber, a plurality of receptacles in the chamber, each receptacle having an opening, an electric heater in the chamber for heating said medium, an electric motor driven means for causing circulation of a heating medium in the chamber, and means controlled by the temperature of said medium for energizing said heater and motor for the circulating means.

3. In a viscoscometer, in combination, a chamber, a plurality of receptacles in the chamber, each receptacle having an opening, an electric heater in the chamber for heating said medium, an electric motor driven means for causing circulation of a heating medium in the chamber, and means controlled by the temperature of said medium for simultaneously energizing said heater and motor for the circulating means.

4. In a viscoscometer, in combination, a chamber, a plurality of receptacles in the chamber, means for heating a medium in the chamber, motor driven means for causing circulation of the medium in the chamber, electrical means for rendering said heating means and motor for the last-named means effective, circuits for said electrical means, and thermostatically operated means for energizing said circuits.

5. In a viscoscometer, in combination, a chamber adapted to contain a liquid, a plurality of liquid receiving receptacles in the chamber, electric means for heating a liquid circulatory medium in said chamber, an impeller wheel for causing circulation of said medium, a motor for driving said impeller wheel, and thermostatically controlled means responsive to changes of temperature of said liquid medium for energizing said electric heating means.

6. In a viscoscometer, in combination, a fluid chamber, an electrical heating element arranged therein, current conductors leading from a source of electrical supply and forming a circuit through said element, a means for making and breaking the circuit through said conductors, a mechanism responsive to changes of temperature in the fluid in said chamber and controlling the operation of said means, a fluid agitator in the chamber, an electrical motor operatively connected with said agitator and current conductors through which an electrical circuit is completed through said motor, said mechanism being arranged to complete or break the circuit through said motor simultaneously with the completion or breaking thereof through the heating element.

7. In a viscoscometer, in combination, a fluid chamber, a plurality of tubes extending through said chamber and forming independent fluid containers, each tube having a discharge orifice, an electrical heating element arranged in the chamber, current conductors leading from a source of electrical supply and forming a circuit through said element, a means for making and breaking the circuit through said conductors, a mechanism responsive to changes of temperature of the fluid in the receptacle and controlling the operation of said means, a fluid agitator in the receptacle, a motor operatively connected with the said agitator, and current conductors through which an electrical circuit is completed through said motor, said mechanism being arranged to complete or break the circuit through said motor simultaneously with the completion or breaking thereof through the heating element.

In testimony whereof I have hereunto signed my name in the presence of two subscribing witnesses.

CHARLES O. LORENZ.

Witnesses:
L. JOHNSON,
R. D. CUNNINGHAM.

Copies of this patent may be obtained for five cents each, by addressing the "Commissioner of Patents, Washington, D. C."